United States Patent
Ito et al.

(10) Patent No.: US 11,621,779 B2
(45) Date of Patent: Apr. 4, 2023

(54) OPTICAL TRANSMISSION SYSTEM AND OPTICAL TRANSMISSION DEVICE SETTING METHOD

(71) Applicant: Nippon Telegraph and Telephone Corporation, Tokyo (JP)

(72) Inventors: Ken Ito, Musashino (JP); Masaaki Inami, Musashino (JP); Hideki Maeda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/617,852

(22) PCT Filed: Jun. 19, 2019

(86) PCT No.: PCT/JP2019/024185
§ 371 (c)(1),
(2) Date: Dec. 9, 2021

(87) PCT Pub. No.: WO2020/255275
PCT Pub. Date: Dec. 24, 2020

(65) Prior Publication Data
US 2022/0239376 A1    Jul. 28, 2022

(51) Int. Cl.
*H04J 14/00* (2006.01)
*H04B 10/50* (2013.01)
(52) U.S. Cl.
CPC .................................. *H04B 10/501* (2013.01)
(58) Field of Classification Search
CPC .... H04B 10/032; H04B 10/035; H04B 10/40; H04B 10/501; H04B 10/0775;
(Continued)

(56) References Cited

U.S. PATENT DOCUMENTS

| | | | | |
|---|---|---|---|---|
| 10,608,774 B2* | 3/2020 | Tse | ................... | H04B 10/0773 |
| 2001/0028490 A1* | 10/2001 | Copeland | ........... | H04B 10/2942 |
| | | | | 398/157 |
| 2011/0158647 A1* | 6/2011 | Solheim | .............. | H04J 14/0257 |
| | | | | 398/48 |

OTHER PUBLICATIONS

Kondo et al., "Implementation and Evaluation of a Management System for Large-scale Campus Networks Using Auto-configuration Functions," Information Processing Society of Japan Journal, 2016, 57(3):998-1007.

(Continued)

*Primary Examiner* — Hanh Phan
(74) *Attorney, Agent, or Firm* — Fish & Richardson P.C.

(57) ABSTRACT

An optical transmission system (10) includes a plurality of transmission devices such as transponders (TPs) and optical cross-connects (OXCs) installed in each of stations (11-15) connected via a communication network, a control device (20), and a substitute OXC (502) serving as a substitute transmission device. The control device 20 is installed in a control station (14) of the stations. The control device (20) controls the transmission devices of the stations (11-15) in a centralized manner in accordance with physical network (NW) configuration information (20D) stored in a DB (21) and including config information. When a transmission device is replaced with a new OXC (5o3) serving as a new transmission device, the substitute OXC (5o2) operates as a substitute for the new OXC (5o3) to communicate with the control device (20) until config setting necessary for the new OXC (5o3) is completed.

5 Claims, 6 Drawing Sheets

(58) Field of Classification Search
CPC .......... H04B 10/0773; H04Q 11/0003; H04Q 11/0005; H04Q 11/0062; H04Q 11/0066; H04Q 11/0067; H04J 14/02; H04J 14/0202
USPC ........ 398/2, 3, 4, 5, 7, 8, 79, 83, 59, 45, 48, 398/49, 56, 57, 33, 38, 25, 30, 31, 32, 398/177, 173, 175, 135, 136, 22, 23, 24, 398/50
See application file for complete search history.

(56) References Cited

OTHER PUBLICATIONS

Sakata et al., "Efficient Processing Methods of Router Control Requests for Managing Large-Scale IP Network," Journal of the Institute of Electronics, Information and Communication Engineers, 2012, J95-B(8):932-942, 23 pages (with English Translation).

* cited by examiner

OPTICAL TRANSMISSION SYSTEM AND OPTICAL TRANSMISSION DEVICE SETTING METHOD

CROSS-REFERENCE TO RELATED APPLICATIONS

This application is a National Stage application under 35 U.S.C. § 371 of International Application No. PCT/JP2019/024185, having an International Filing Date of Jun. 19, 2019. The disclosure of the prior application is considered part of the disclosure of this application, and is incorporated in its entirety into this application.

TECHNICAL FIELD

The present invention relates to an optical transmission system and an optical transmission device setting method for automatically setting necessary configuration information when an optical transmission device is newly connected as a replacement in stations connected via a communication network.

BACKGROUND ART

In a known optical transmission system, a plurality of stations, such as communication stations, connected to each other via a network are individually equipped with optical transmission devices such as transponders and optical cross-connects (OXCs), and control devices are provided for the respective optical transmission devices. The control device uses a physical communication port to identify an optical transmission device under the communication port. Thus, for example, when an OXC is replaced due to failure, necessary configuration information is dynamically set by coupling another OXC as a replacement to the same port of the control device without special setting performed by a maintenance staff after replacement work. Hereinafter, the optical transmission device is also referred to as a transmission device.

However, the control device needs to be provided for each station in accordance with the type of transmission device such as a transponder or an OXC, and additionally, the control device needs to be provided in a 1+1 redundant configuration. As a result, this configuration has disadvantages of increased hardware costs, increased installation spaces, and increased power consumption.

In response to this, an optical transmission system has been developed in which the control devices of the transmission devices in all stations connected via a network are collectively implemented in a station deemed as a single station (also shortly referred to as a deemed single station). In this case, the control device in the deemed single station can control the transmission devices in all the stations, and consequently, it is possible to reduce installation spaces, power consumption, and hardware costs. Examples of this kind of technology are described in Non-Patent Literatures 1 and 2. It should be noted that the expression "station deemed as a single station (deemed single station)" is used because the station is not limited to one and may be two or more.

CITATION LIST

Non-Patent Literature

Non-Patent Literature 1: Sakata et al., "Efficient Processing Methods of Router Control Requests for Managing Large-Scale IP Network". The transactions of the Institute of Electronics, Information and Communication Engineers. B, Vol. J95-B, No. 8, pp. 932-942, Aug. 1, 2012

Non-Patent Literature 2: Kondo et al., "Implementation and Evaluation of a Management System for Large-scale Campus Networks Using Auto-configuration Functions". Transactions of Information Processing Society of Japan, Vol. 57, No. 3, pp. 998-1007, March, 2016

SUMMARY OF THE INVENTION

Technical Problem

As described above, in the optical transmission system in which a control device is implemented in a deemed single station in a collective manner, the control device controls transmission devices in a plurality of stations by using a single physical port. Here, when a transmission device is newly replaced due to failure in a station, a signal regarding this replacement is transmitted to the single port of the control device.

However, since signals from a plurality of transmission devices are transmitted to the single port of the control device, the control device cannot identify which transmission device has transmitted a particular signal in accordance with information from the single port. Thus, the control device cannot identify which transmission device has been replaced, and as a result, there is a problem in which necessary configuration information cannot be set for a transmission device as a replacement. Since configuration information cannot be set, the transmission device as a replacement cannot operate.

The present invention has been made in consideration of the above circumstances, and an object thereof is to provide an optical transmission system and an optical transmission device setting method for automatically setting configuration information necessary for a transmission device as a replacement in a station in a configuration in which a control device for controlling transmission devices in different stations is implemented in a deemed single station in a collective manner.

Means for Solving the Problem

To address the problem described above, an optical transmission system of the present invention includes a plurality of transmission devices installed in each of a plurality of stations connected via a communication network, the plurality of transmission devices being configured to have different functions of optical transmission processing, a control device installed in a deemed single station of the plurality of stations, the deemed single station serving as a control station, the control device being configured to store in a data base (DB) physical network (NW) configuration information including serial numbers of the plurality of transmission devices of the plurality of stations, physical port information, connection information among the plurality of transmission devices, and configuration information to be necessarily set for the plurality of transmission devices, the control device being configured to control the plurality of transmission devices of the plurality of stations in a centralized manner in accordance with the stored physical NW configuration information, and a substitute transmission device configured to, when a transmission device of the plurality of transmission devices is replaced with a new transmission device, operate as a substitute for the new transmission device to communicate with the control device until configuration setting necessary for the new transmission device is completed.

Effects of the Invention

The present invention can automatically set configuration information necessary for a transmission device as a replacement in a station in a configuration in which a control device for controlling transmission devices in different stations is implemented in a deemed single station in a collective manner.

DESCRIPTION OF EMBODIMENTS

Hereinafter, the embodiment of the present invention will be described referring to the drawings. In all the drawings of this specification, constituent elements corresponding to each other with regard to function are assigned the same reference character, and descriptions thereof are omitted as appropriate.

<Configuration According to Embodiment>

Figure 1:
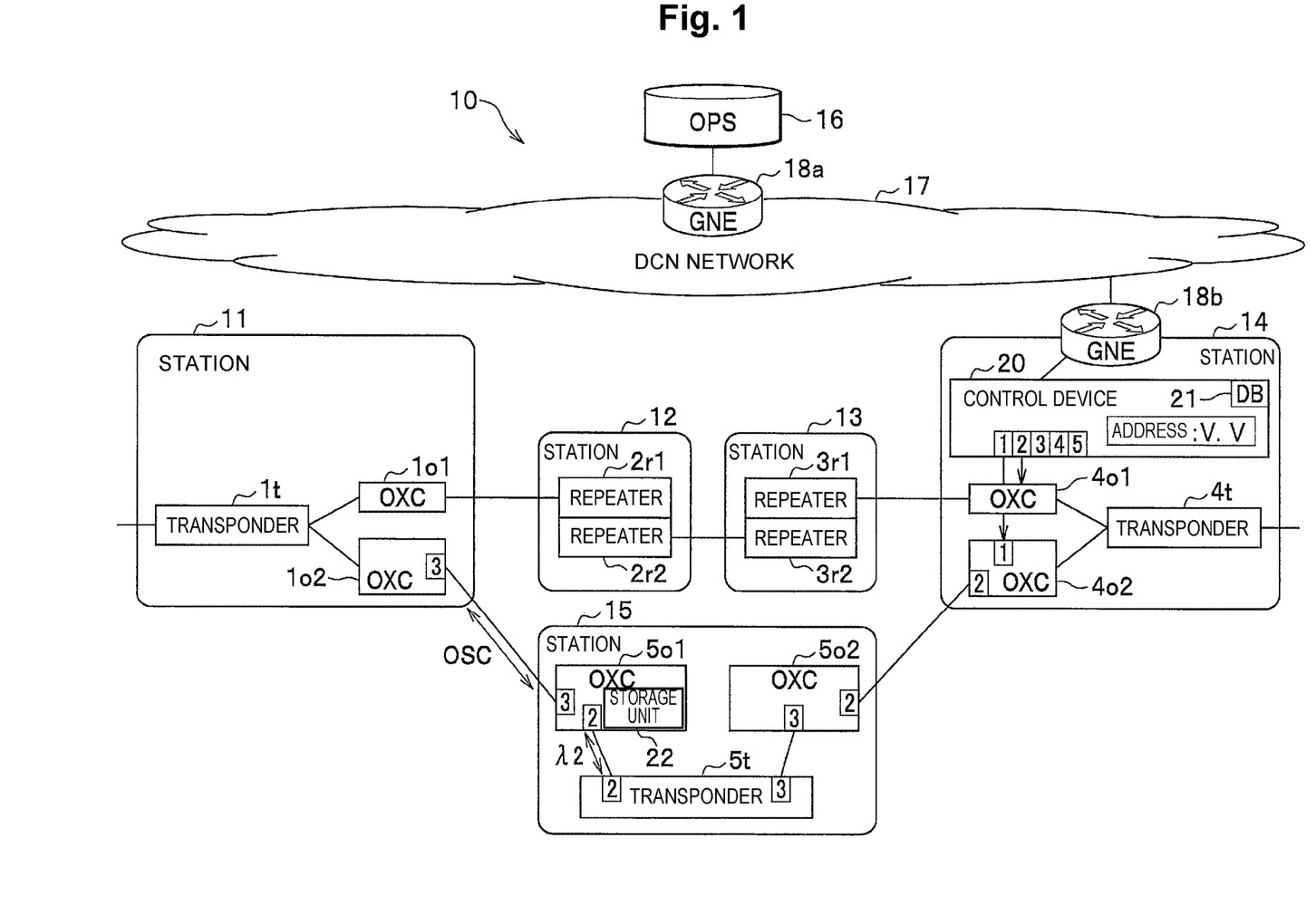
FIG. 1 is a block diagram illustrating a configuration of an optical transmission system according to an embodiment of the present invention.

FIG. 1 is a block diagram illustrating a configuration of an optical transmission system according to an embodiment of the present invention. An optical transmission system 10 illustrated in FIG. 1 includes stations 11, 12, 13, 14, and 15 such as communication stations equipped with transmission devices (optical transmission devices) for performing optical transmission processing such as transponders (repeaters) and optical cross-connects (OXCs). Of the stations 11 to 15, the station 14 deemed as a single station equipped with a control device 20 is connected to a data communication network (DCN) 17 via a gateway network element (GNE) 18b. An operation system (OPS) 16 is connected to the DCN 17 via a GNE 18a. The transmission devices of the stations 11 to 15 are connected via a network using, for example, optical fibers.

For example, the OPS 16 manages network elements such as switchboards and base stations. The DCN 17 is an information transfer network through which administration information between the OPS 16 and nodes as the transmission devices of the stations 11 to 15 is communicated via the GNEs 18a and 18b functioning as firewalls.

A transponder 1t and two OXCs 1o1 and 1o2 are provided as transmission devices in the station 11. For example, the OXC switches routes in accordance with wave length by branching or inserting a signal of a particular wavelength of multiplexed optical signals. The transponder is also referred to as TP.

Repeaters 2r1 and 2r2 as transmission devices for amplifying an optical signal and retransmit the optical signal are provided in the station 12. Repeaters 3r1 and 3r2 are provided in the station 13. Two OXCs 5o1 and 5o2 and a TP 5t are provided in the station 15. The station 14 is a centralized control station. Two OXCs 4o1 and 4o2, a TP 4t, and the control device 20 are provided in the station 14.

A port at one end of the TP 1t of the station 11 is coupled to a communication device not illustrated in the drawing. Another port at the other end of the TP 1t is coupled to the OXCs 1o1 and 1o2. The OXC 1o1 is coupled to the repeater 2r1 of the station 12 by using an optical fiber. In the station 12, the repeater 2r2 configured to cooperate with the repeater 2r1 is coupled to the repeater 3r2 of the station 13 by using an optical fiber. The repeater 3r1 configured to cooperate with the repeater 3r2 of the station 13 is coupled to the OXC 4o1 of the station 14 by using an optical fiber. It should be noted that repeaters are unnecessary when stations are located close to each other.

The OXC 1o2 of the station 11 is coupled to the OXC 5o1 of the station 15 by using an optical fiber. In the station 15, the OXCs 1o2 and 5o1 are coupled to each other by using ports 3 provided respectively for the OXCs 1o2 and 5o1. The OXC 5o1 and the TP 5t are coupled to each other by using ports 2 provided respectively for the OXC 5o1 and the TP 5t. The TP 5t and the OXC 5o2 are coupled to each other by using ports 3 respectively for the TP 5t and the OXC 5o2. The OXC 5o2 is coupled to the OXC 4o2 of the station 14 via ports 2 provided respectively for the OXCs 5o2 and 4o2 by using an optical fiber. The ports can be connected to each other when their port number is the same.

In the station 14, the OXCs 4o2 and 4o1 are coupled to the TP 4t. The TP 4t is coupled to a communication device not illustrated in the drawing by using an optical fiber. The OXC 4o1 is coupled to ports 1 and 2 of the control device 20. The OXC 4o2 is coupled to the port 1 of the control device 20 via the OXC 4o1.

The control device 20 collectively controls, by using physical ports 1, 2, 3, 4, and 5, the transmission devices of all the stations 11 to 15 connected to each other via a network. Since the station 14 deemed as a single station centrally controls the transmission devices of all the stations 11 to 15, the station 14 is also referred to as the control station 14. It is assumed that the address unique to the control device 20 is V. V.

Figure 2:
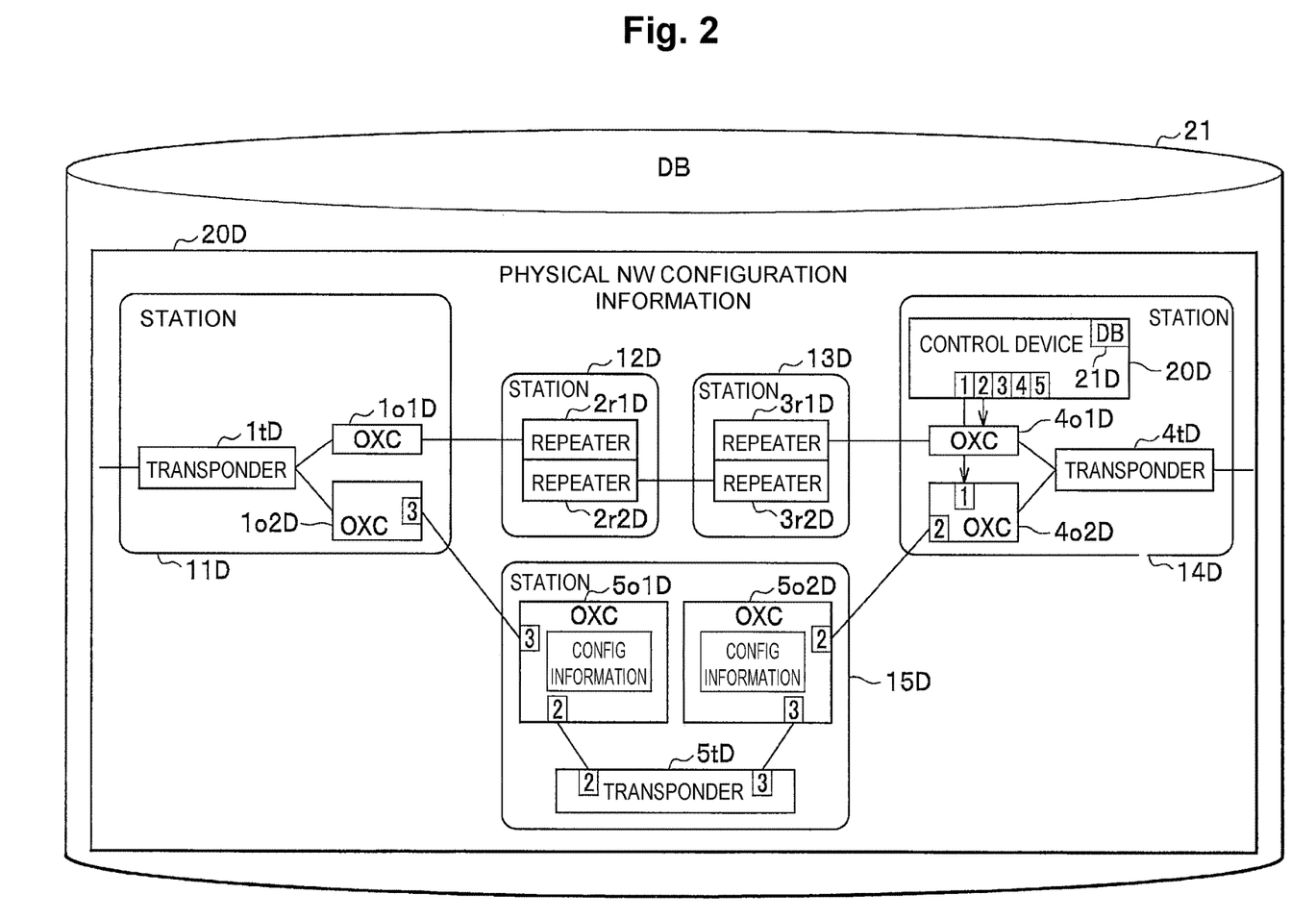
FIG. 2 illustrates details of physical NW configuration information stored in a data base (DB) of a control device of a control station.

The control device 20 includes a data base (DB) 21. The DB 21 may be provided separately from the control device 20. As illustrated in FIG. 2, the DB 21 stores physical network (NW) configuration information 20D that characterizes the present embodiment. The physical NW configuration information 20D is constituted by, for example, information unique to the stations 11 to 15 connected to each other via a network, information unique to the individual transmission devices provided in the stations 11 to 15, and connection information of the individual transmission devices.

The control device 20 creates the physical NW configuration information 20D by obtaining from the transmission devices of all the stations 11 to 15, for example, physical port information, neighbor information (described later), transmission device serial numbers, and configuration information to be set. Hereinafter, configuration is also referred to as config.

The neighbor information indicates a connection route to a particular transmission device from a neighboring transmission device such as a TP or OXC coupled to the particular transmission device and the type of the transmission device. For example, the OXC 5o1 of the station 15 illustrated in FIG. 1 creates neighbor information by recognizing that the OXC 5o1 of the station 15 is coupled to the TP 5t of the same station 15 via the ports 2 and coupled to the OXC 1o2 of the different station 11 via the ports 3, and the OXC 5o1 of the station 15 stores the created neighbor information in a storage unit 22.

The neighbor information of this case includes connection information indicating that the OXC 5o1 of the station 15 is coupled to the TP 5t of the same station 15 via the ports 2 and the OXC 1o2 of the different station 11 via the ports 3 and also includes information indicating that the type of transmission device is the TP 5t and the OXC 1o2. The neighbor information stored in the storage unit 22 is transmitted through the transponder 5t and the OXC 5o2, further communicated through the OXCs 4o2 and 4o1 of the control station 14, then received by the port 1 of the control device 20, and consequently stored in the DB 21.

Figure 3:
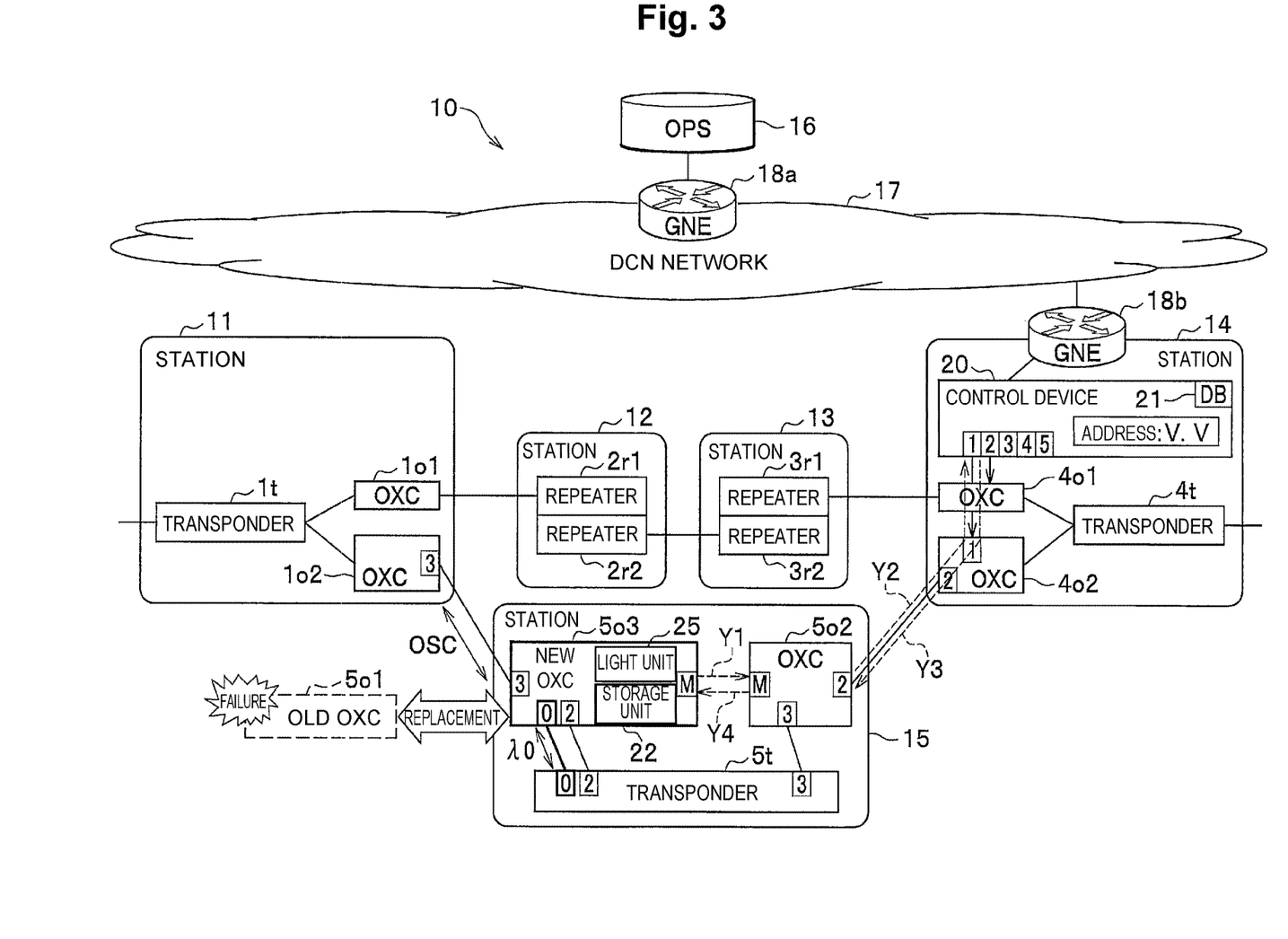
FIG. 3 illustrates a state in which an old transmission device is replaced with a new transmission device in a station in the optical transmission system of the present embodiment.

The following describes a process of a case in which, in a station (for example, the station 15), the OXC 5o1 (the old OXC 5o1) has been broken and replaced with a new OXC 5o3 by a maintenance staff as illustrated in FIG. 3. This example is characterized in that a control port 0 and an administration port M are provided in the new OXC 5o3 illustrated in the station 15. The TP 5t includes the control port 0, and the OXC 5o2 includes the administration port M. The OXC 5o2 operates as the substitute OXC 5o2 described later until appropriate config information is set for the new OXC 5o3 after replacement.

The maintenance staff connects the control port 0 of the new OXC 5o3 after replacement to the control port 0 of the TP 5t and also connects the port 2 of the new OXC 5o3 to the port 2 of the TP 5t. The maintenance staff also connects the administration port M of the new OXC 5o3 to the administration port M of the OXC 5o2 and connects the port 3 of the new OXC 5o3 to the port 3 of the OXC 1o2 of the different station 11.

Since the new OXC 5o3 is newly used as a replacement, the new OXC 5o3 retains in the storage unit 22 initial information such as config information in the initial state and a destination address. This means that in the initial state the new OXC 5o3 retains config information set in the initial state and a destination address of the control device 20 (for example, a destination address A. A). Since the destination address A. A in the initial state is previously set in the new OXC 5o3, the destination address A. A is different from the address V. V currently set for the control device 20.

By using the destination address A. A set in the initial state, the new OXC 5o3 submits to the control device 20 of the control station 14 a request (config request) to obtain config information to set necessary configuration for the new OXC 5o3. This config request is submitted to the substitute OXC 5o2 via the administration ports M as indicated by an arrow Y1.

Until appropriate config information is set for the new OXC 5o3 by using the control device 20 described later, the substitute OXC 5o2 performs the following substitute processing. Specifically, the substitute OXC 5o2 previously retains the address V. V of the control device 20; when the destination address A. A different from the address V. V is sent from the new OXC 5o3 after replacement via the administration ports M, the substitute OXC 5o2 recognizes the new OXC 5o3 having sent the destination address A. A as a new device.

After the recognition, the substitute OXC 5o2 converts the destination address A. A into the destination address V. V previously retained and sends the config request from the new OXC 5o3 to the destination address V. V after conversion as indicated by an arrow Y2. This config request is sent from the substitute OXC 5o2 via the OXCs 4o2 and 4o1 of the control station 14 to the control device 20.

When the control device 20 receives the config request, the control device 20 recognizes that the config request is sent by the substitute OXC 5o2 that is previously recognized. After this, the control device 20 sends to the substitute OXC 5o2 having sent the config request a request for neighbor information and a request for a trace route by following the route indicated by an arrow Y3. The request for trace route information is submitted to the substitute OXC 5o2 to specify a communication route from the control device 20 to the substitute OXC 5o2.

When the substitute OXC 5o2 receives the request for trace route information, the substitute OXC 5o2 sends back the trace route information described below to the control device 20 as indicated by the arrow Y2. The trace route information in this case indicates a route starting from the port 1 of the control device 20, passing through the OXC 4o1, the port 1 of the OXC 4o2, the port 2 of the OXC 4o2, and then the port 2 of the substitute OXC 5o2, and reaching the substitute OXC 5o2 and also indicates an opposite route in a direction opposite to the direction of the route.

When the substitute OXC 5o2 receives the request for neighbor information, the substitute OXC 5o2 transfers this request to the new OXC 5o3 as indicated by an arrow Y4.

Here, when the new OXC 5o3 has not been configured in an appropriate manner after new replacement, since an optical supervisory channel (OSC) is transmitted and received between the new OXC 5o3 and the OXC 1o2, which is the same kind of transmission device in the different station 11, by using the ports 3, and as a result, the new OXC 5o3 automatically recognizes and obtains the neighbor information. In this case, information indicating that the transmission device "OXC 1o2" as a connection destination is coupled to a port number "3" is stored in the storage unit 22 of the new OXC 5o3 as neighbor information 5D indicated in FIG. 4. It should be noted that the OSC is a supervisory signal corresponding to the layer of an optical signal.

When in the station 15 the new OXC 5o3 and the TP 5t are coupled to each other by using the ports 2 as described above, in the case in which config information has not been set for the new OXC 5o3, communication cannot be established between the ports 2.

However, the new OXC 5o3 and the TP 5t are also coupled to each other by using the control ports 0 as described above, and thus, when config information has not been set, the control ports 0 can establish communication by using an optical signal of a wavelength $\lambda 0$. By this communication, the new OXC 5o3 and the TP 5t automatically recognize and obtain neighbor information in a mutual manner. In this case, information indicating that the transmission device "transponder 5t" as a connection destination is coupled to a port number "2" is stored in the storage unit 22 of the new OXC 5o3 as the neighbor information 5D indicated in FIG. 4.

Figure 4:
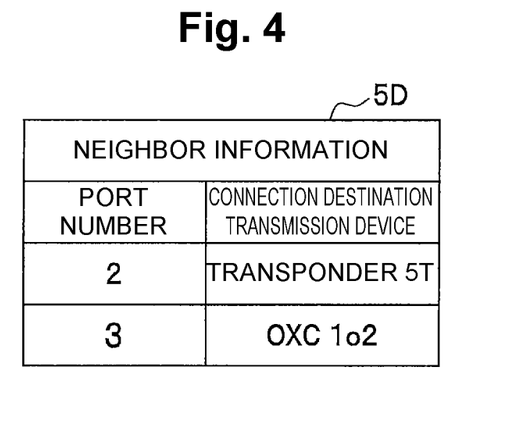
FIG. 4 illustrates details of neighbor information stored in a storage unit of the new transmission device.

As a result, the neighbor information 5D is tabulated information indicating that the "transponder 5t" is coupled to the port number "2" of the new OXC 5o3, and the "OXC 1o2" is coupled to the port number "3" of the new OXC 5o3.

When the new OXC 5o3 receives the request for neighbor information described above from the substitute OXC 5o2, the new OXC 5o3 sends back the neighbor information 5D to the control device 20 via the substitute OXC 5o2 by using the administration ports M. When the control device 20 receives the sent neighbor information 5D, the control device 20 realizes, in accordance with the neighbor information 5D, that the new OXC 5o3 is coupled to the OXC 1o2 of the different station 11 via the port 3 and the TP 5t via the port 2. The control device 20 recognizes, in accordance with the physical NW configuration information 20D previously stored in the DB 21, that the TP 5t of the station 15 and the OXC 5o2, which currently serves as a substitute, are coupled to each other via the ports 3.

In accordance with these connections, the control device 20 recognizes that the config request received from the substitute OXC 5o2 has been sent by the new OXC 5o3. In accordance with this recognition, the control device 20 sends back config information to be set for the new OXC 5o3 in response to the config request together with the address V. V of the control device 20 to the substitute OXC 5o2 by following the route (the arrows Y3 and Y4) indicated by the trace route information received as described above. The substitute OXC 5o2 receives the sent config information and transfers the config information to the new OXC 5o3.

In accordance with the transferred config information, the new OXC 5o3 is configured (config setting). By this config setting, a wavelength $\lambda 2$ is automatically set for the communication between the port 2 of the new OXC 5o3 and the port 2 of the TP 5t. At the time of this setting, the new OXC•C changes the destination address A. A, which has been initially set, to the destination address V. V, which is sent. By this change, the new OXC 5o3 can communicate with the control device 20 via the TP 5t with the port 2, the OXC 5o2 coupled to the TP 5t with the port 3, and further through the OXCs 4o2 and 4o1 of the control station 14.

This processing of config setting is performed after the maintenance staff connects the ports 0, 2, 3, and M at the time of new replacement of the new OXC 5o3, as described above. When the config setting is completed, a light unit 25 such as a light emitting diode (LED) of the new OXC 5o3 lights up. The light unit 25 is not illustrated in the drawings. The light unit 25 is placed in a conspicuous position such as a wiring portion of the control port 0 and the administration port M. After the light unit 25 lights up, the maintenance staff disconnects wirings of the control port 0 and the administration port M that are unnecessary for normal operation and finishes the replacement work.

<Hardware Configuration>

Figure 5:
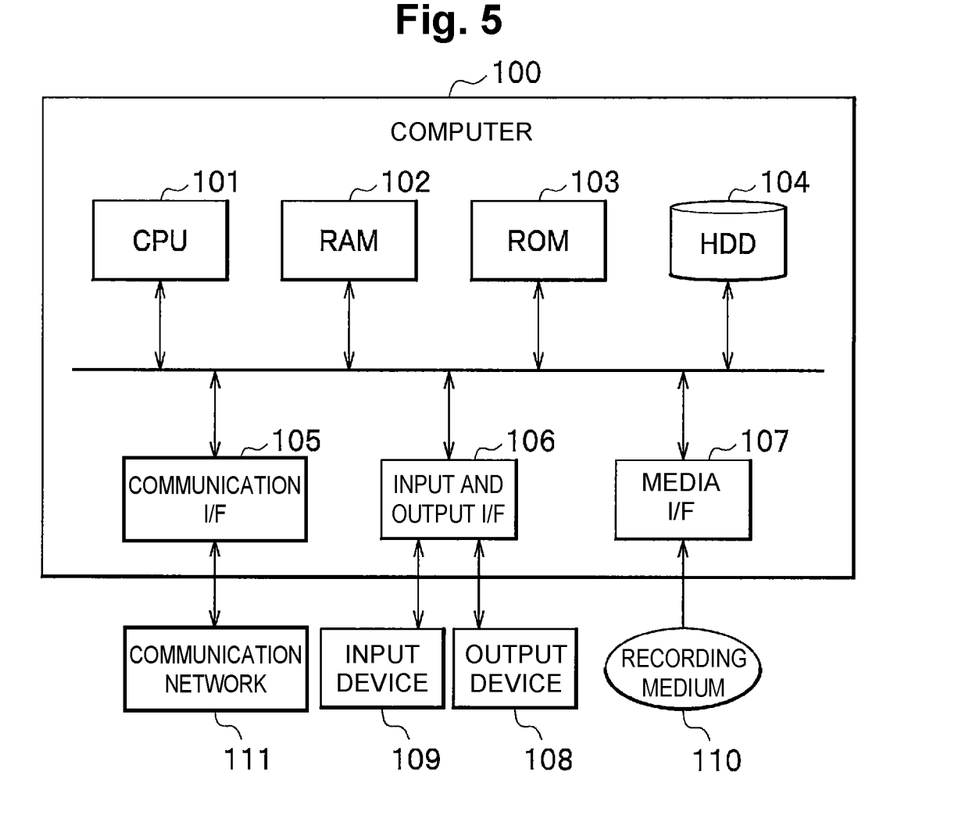
FIG. 5 illustrates a hardware configuration of an example of a computer configured to implement the functionality of the control device.

The control device 20 of the optical transmission system 10 according to the embodiment described above is implemented as, for example, a computer 100 having a configuration illustrated in FIG. 5. In the following description, the control device 20 will be used as an example. FIG. 5 illustrates a hardware configuration of an example of the computer 100 configured to implement the functionality of the control device 20. The computer 100 includes a central processing unit (CPU) 101, a random access memory (RAM) 102, a read only memory (ROM) 103, a hard disk drive (HDD) 104, a communication interface (I/F) 105, an input and output I/F 106, and a media I/F 107. The communication I/F 105 includes the ports 1 to 5 of the control device 20 illustrated in FIG. 1.

The CPU 101 controls the components by operating in accordance with programs stored in the ROM 103 or the HDD 104. The ROM 103 stores, for example, a boot program to be run by the CPU 101 when the computer 100 starts and a program dependent on hardware of the computer 100.

The HDD 104 stores, for example, a program to be run by the CPU 101 and data to be used by the program. The communication I/F 105 receives data from another device through a communication network 50 and transmits the data to the CPU 101. The communication I/F 105 also transmits data generated by the CPU 101 to another device through the communication network 50.

In the control device 20 illustrated in FIG. 1, optical fibers used as the communication network 50 are coupled to the ports 1 to 5 as the communication I/F 105 via the OXCs 4o1 and 4o2. The repeaters 3r1 and 3r2 of the station 13 and the OXC 5o2 of the station 15 are coupled to the optical fibers.

The CPU 101 illustrated in FIG. 5 controls an output device 108 such as a display or a printer and an input device 109 such as a keyboard or a mouse via the input and output I/F 106. The CPU 101 obtains data from the input device 109 via the input and output I/F 106. The CPU 101 outputs generated data to the output device 108 via the input and output I/F 106. In the optical transmission system 10 of the present embodiment, the GNE 18b is coupled between the input and output I/F 106 and the input device 109 and the output device 108, and the input device 109 and the output device 108 serve as the OPS 16. As a result, operation data of the OPS 16 is input from the input and output I/F 106 via the GNE 18b to the control device 20 (computer 100).

The media I/F 107 reads a program or data stored in a recording medium 110 and provides the program or data for the CPU 101 by using the RAM 102. The CPU 101 loads a program for a target process onto the RAM 102 from the recording medium 110 via the media I/F 107 and runs the loaded program. The recording medium 110 is, for example, an optical recording medium, such as a digital versatile disc (DVD) or phase change rewritable disk (PD), a magneto-optical recording medium, such as a magneto optical disk (MO), a tape medium, a magnetic recording medium, or a semiconductor memory.

For example, when the computer 100 functions as the control device 20, the CPU 101 of the computer 100 implements the functionality of the control device 20 by running a program loaded onto the RAM 102. The data in the RAM 102 is stored in the HDD 104. While the CPU 101 of the computer 100 reads a program for a target process from the recording medium 110 and runs the program, the CPU 101 may obtain a program for a target process from, for example, another device through a communication network 111.

<Operation According to Embodiment>

Next, a processing operation of setting for an optical transmission device in the optical transmission system 10 according to the present embodiment will be described referring to a flowchart in FIG. 6. As a precondition, it is assumed that the DB 21 of the control device 20 installed in the control station 14 illustrated in FIG. 1 previously stores the physical NW configuration information 20D indicated in FIG. 2. The control device 20 creates the physical NW configuration information 20D by obtaining from the transmission devices such as TPs and OXCs of all the stations 11 to 15, for example, physical port information, neighbor information, transmission device serial numbers, and config information to be set.

In step S1 indicated in FIG. 5, it is assumed that the old OXC 5o1 has been broken and a maintenance staff replaces the old OXC 5o1 with the new OXC 5o3 in the station 15 illustrated in FIG. 3. At this time, the maintenance staff connects the control port 0 of the new OXC 5o3 to the control port 0 of the TP 5t, the port 2 of the new OXC 5o3 to the port 2 of the TP 5t, and the administration port M of the new OXC 5o3 to the administration port M of the OX 5o2 (also referred to as the substitute OXC 5o2). Additionally, the maintenance staff connects the port 3 of the new OXC 5o3 to the port 3 of the OXC 1o2 of the different station 11.

At the time of this replacement, config information, a destination address, and the destination address A. A of the control device 20 installed in the control station 14, which have been initially set, are stored in the storage unit 22 of the new OXC 5o3. Since the destination address A. A has been initially set, the destination address A. A is different from the address V. V actually set for the control device 20.

In step S2, the new OXC 5o3 sends to the destination address A. A, which has been set in the initial state, a config request to set configuration necessary for the new OXC 5o3. This config request is firstly submitted to the substitute OXC 5o2 via the administration ports M.

In step S3, the substitute OXC 5o2 determines whether the submitted destination address A. A is different from the previously retained address V. V of the control device 20. When the determination result indicates that the destination address A. A is not different from the address V. V (No), in other words, when the destination address A. A is identical to the address V. V, the process is ended.

By contrast, when the determination result indicates that the destination address A. A is different from the address V. V (Yes), the substitute OXC 5o2 recognizes the new OXC 5o3 as a new device in step S4.

In step S5, after the recognition, the substitute OXC 5o2 converts the destination address A. A in the initial state into the destination address V. V of the control device 20 previously retained by the substitute OXC 5o2. The substitute OXC 5o2 then sends the config request from the new OXC 5o3 to the destination address V. V after conversion.

In step S6, the control device 20 receives the config request and recognizes the substitute OXC 5o2 having sent this config request.

After this recognition, in step S7, the control device 20 sends back to the substitute OXC 5o2 having sent the config request a request for neighbor information and a request for a trace route.

Figure 6:
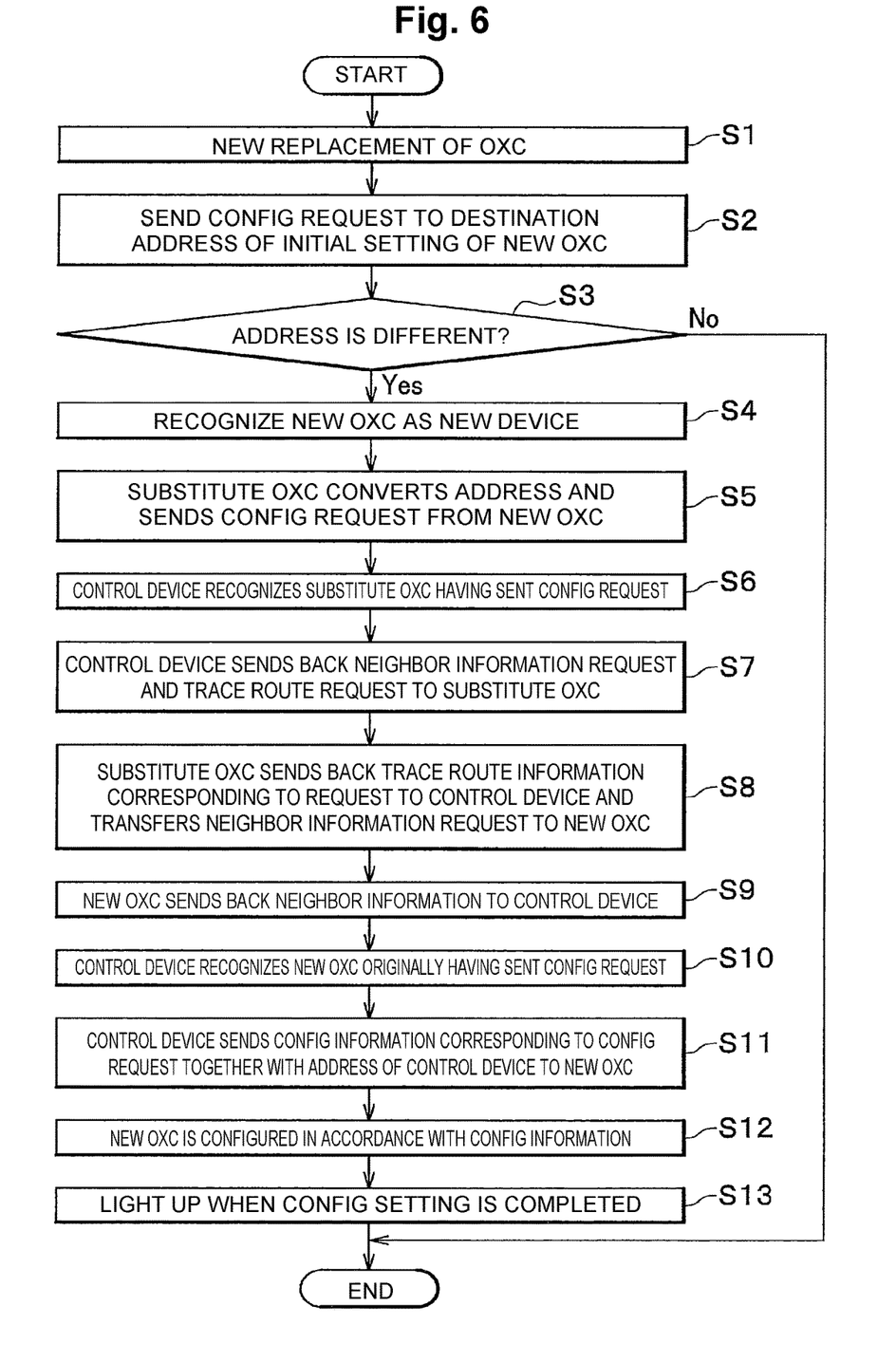
FIG. 6 is a flowchart for explaining a processing operation of setting for an optical transmission device in the optical transmission system of the present embodiment.

Next, in step S8 indicated in FIG. 6, after the substitute OXC 5o2 receives the request for the trace route information, the substitute OXC 5o2 sends back to the control device 20 the trace route information corresponding to the request. The trace route information in this case indicates a route starting from the port 1 of the control device 20, passing through the OXC 4o1, the port 1 of the OXC 4o2, the port 2 of the OXC 4o2, and then the port 2 of the substitute OXC 5o2, and reaching the substitute OXC 5o2 and also indicates an opposite route in a direction opposite to the direction of the route. After the substitute OXC 5o2 receives the request for neighbor information, the substitute OXC 5o2 transfers this request to the new OXC 5o3.

Here, it is assumed that the storage unit 22 of the new OXC 5o3 stores the neighbor information 5D indicating that the "transponder 5t" is coupled to the port number "2", and the "OXC 1o2" is coupled to the port number "3" as presented in FIG. 4.

In step S9, after the new OXC 5o3 receives the request for neighbor information from the substitute OXC 5o2, the new OXC 5o3 sends back the neighbor information 5D stored in the storage unit 22 to the control device 20.

In step S10, after the control device 20 receives the sent neighbor information 5D, the control device 20 recognizes, in accordance with the connection information included in the neighbor information 5D received and the physical NW configuration information 20D stored in the DB 21, that the new OXC 5o3 has sent the config request received from the substitute OXC 5o2 in step S9 described above.

In accordance with this recognition, in step S11, the control device 20 sends back config information to be set for the new OXC 5o3 in response to the received config request together with the address V. V of the control device 20 to the substitute OXC 5o2 by following the route indicated by the trace route information received in step S8 described above. The substitute OXC 5o2 receives the sent config information and transfers the config information to the new OXC 5o3.

In step S12, in accordance with the transferred config information, the new OXC 5o3 is configured. By this config setting, the wavelength λ2 is automatically set for communication between the new OXC 5o3 and the port 2 of the TP 5t. At this time, the destination address A. A having been initially set is changed to the submitted destination address V. V. By this change, the new OXC 5o3 can communicate with the control device 20 via the TP 5t and the OXC 5o2 and further through the OXCs 4o2 and 4o1 of the control station 14, such that the config setting is completed.

In step S13, when the config setting is completed, the light unit 25 of the new OXC 5o3 lights up. The maintenance staff then disconnects wirings connected to the control port 0 and the administration port M, which are unnecessary for normal operation, and finishes replacement work.

<Effects>

Effects of the optical transmission system 10 according to the present embodiment will be described.

(1) The optical transmission system 10 includes a plurality of transmission devices (the transponders 1t, 4t, and 5t, the OXCs 1o1, 1o2, 4o1, 4o2, 5o1, and 5o2, and the like) installed in each of the plurality of stations 11 to 15 connected via a communication network and having different functions of optical transmission processing, the control device 20 installed in the deemed single station 14 of the plurality of stations 11 to 15, the deemed single station 14 serving as the control station 14, the control device 20 being configured to store in the DB 21 the physical NW configuration information 20D including serial numbers of the plurality of transmission devices of the plurality of stations 11 to 15, the physical port information, the connection information among the plurality of transmission devices, and the config (configuration) information to be necessarily set for the plurality of transmission devices, the control device 20 being configured to control the plurality of transmission devices of the plurality of stations 11 to 15 in a centralized manner in accordance with the stored physical NW configuration information 20D, and a substitute transmission device (the substitute OXC 5o2) configured to, when a transmission device of the plurality of transmission devices is replaced with a new transmission device (the new OXC 5o3), operate as a substitute for the new transmission device to communicate with the control device 20 until config setting necessary for the new transmission device is completed.

With this configuration, when a transmission device is replaced with a new transmission device in a station of the stations 11 to 15, the substitute transmission device performs substitute communication, and as a result, the config information sent by the control device 20 of the control stations 11 to 15 is set for the new transmission device. As such, it is possible to automatically set config information necessary for a transmission device as a replacement in a station of the stations 11 to 15 in the configuration in which the control device 20 for controlling the transmission devices in the different stations 11 to 15 is implemented in a deemed single station 11 to 15 in a collective manner.

(2) In the optical transmission system 10, the administration ports M used for communication are respectively provided for the new transmission device and the substitute transmission device; when the new transmission device is newly connected as a replacement, the new transmission device and the substitute transmission device establish temporary connection by using the administration ports M; when the config setting necessary for the new transmission device is completed, the temporary connection is disconnected.

With this configuration, when the config setting is completed for the new transmission device, particular ports are activated to couple the new transmission device and a particular transmission device having been coupled to the old transmission device (the old OXC 5o1) before the new transmission device is newly connected as a replacement. As a result, the new transmission device can communicate with the control device 20 via the transmission device coupled to the new transmission device by using the activated ports. This means that after the new transmission device is connected as a replacement the new transmission device can communicate with the control device 20 by using the same route as the route used before replacement.

(3) In the optical transmission system 10, the control ports 0 used for communication are respectively provided for the new transmission device and a particular transmission device of the plurality of transmission devices, the particular transmission device having been coupled to the old transmission device replaced with the new transmission device; when the new transmission device is newly connected as a replacement, the new transmission device and the particular transmission device establish temporary connection by using the control ports 0; when the config setting necessary for the new transmission device is completed, the temporary connection is disconnected.

This configuration can achieve the following effects and advantages. When the config setting has not been configured for the new transmission device, the new transmission device and the particular transmission device having been coupled to the old transmission device before the new transmission device is newly connected as a replacement cannot communicate with each other by using the ports originally provided. However, since the control ports 0 are temporarily connected to each other when the new transmission device is newly connected as a replacement, the new transmission device and the particular transmission device can communicate with each other. Thus, the new transmission device can send to the control device 20 via the substitute transmission device the neighbor information indicating a connection to a neighboring transmission device. In accordance with the neighbor information, the control device 20 can send the config information necessary for the new transmission device to the new transmission device via the substitute transmission device.

When the config setting is completed for the new transmission device in accordance with the sent config information, the new transmission device and the particular transmission device can communicate with each other by using the ports provided for the new transmission device and the particular transmission device, and consequently, the new transmission device can communicate with the control device 20 by using the same route as the route used before replacement.

(4) In the optical transmission system 10, the new transmission device includes the light unit 25 configured to light up after the config setting is completed.

With this configuration, when the new transmission device is connected as a replacement and the config setting is then completed, the light unit 25 lights up, and accordingly, the maintenance staff can properly realize that the config setting has been completed. Thus, after the maintenance staff views the lighting up of the light unit 25, the maintenance staff can timely disconnect the temporary connection between the new transmission device and the substitute transmission device.

Additionally, the specific configuration can be changed as appropriate without departing from the spirit and scope of the present invention.

REFERENCE SIGNS LIST

10 Optical transmission system
11-15 Station
14 Control station
1*t*, 4*t*, 5*t* Transponder
1*o*1, 1*o*2, 4*o*1, 4*o*2, 5*o*1, 5*o*2, 5*o*3 OXC
5*o*1 Old OXC
5*o*3 New OXC
2*r*1, 2*r*2, 3*r*1, 3*r*2 Repeater
0 Control port
1, 2, 3, 4, 5 Port
M Administration port
20D Physical NW configuration information
21 DB
22 Storage unit
25 Light unit

The invention claimed is:

1. An optical transmission system comprising:
a plurality of transmission devices installed in each of a plurality of stations connected via a communication network, the plurality of transmission devices being configured to have different functions of optical transmission processing;
a control device installed in a deemed single station of the plurality of stations, the deemed single station serving as a control station, the control device being configured to store in a data base (DB) physical network (NW) configuration information including serial numbers of the plurality of transmission devices of the plurality of stations, physical port information, connection information among the plurality of transmission devices, and configuration information to be necessarily set for the plurality of transmission devices, the control device being configured to control the plurality of transmission devices of the plurality of stations in a centralized manner in accordance with the stored physical NW configuration information; and
a substitute transmission device configured to, when a transmission device of the plurality of transmission devices is replaced with a new transmission device, operate as a substitute for the new transmission device to communicate with the control device until configuration setting necessary for the new transmission device is completed.

2. The optical transmission system according to claim 1, wherein administration ports used for communication are respectively provided for the new transmission device and the substitute transmission device, when the new transmission device is newly connected as a replacement, the new transmission device and the substitute transmission device are configured to establish temporary connection by using the administration ports, and when the configuration setting necessary for the new transmission device is completed, the temporary connection is disconnected.

3. The optical transmission system according to claim 2, wherein control ports used for communication are respectively provided for the new transmission device and a particular transmission device of the plurality of transmission devices, the particular transmission device having been coupled to an old transmission device replaced with the new transmission device, when the new transmission device is newly connected as a replacement, the new transmission device and the particular transmission device are configured to establish temporary connection by using the control ports, and when the configuration setting necessary for the new transmission device is completed, the temporary connection is configured to be disconnected.

4. The optical transmission system according to claim 2, wherein the new transmission device includes a light unit configured to light up when the configuration setting is completed.

5. An optical transmission device setting method for an optical transmission system, the method comprising, when a transmission device having a function of optical transmission processing is newly connected as a replacement in stations connected via a communication network, setting configuration information necessary for the transmission device, wherein the optical transmission system includes a control device installed in a deemed single station of the stations, the deemed single station serving as a control station, the control device being configured to store in a DB physical NW configuration information including serial numbers of transmission devices of the stations, physical port information, connection information among the transmission devices, and the configuration information to be necessarily set for the transmission devices, the control device being configured to control the transmission devices of the stations in a centralized manner in accordance with the stored physical NW configuration information, and a substitute transmission device configured to, when a transmission device of the transmission devices is replaced with a new transmission device, operate as a substitute for the new transmission device to communicate with the control device until configuration setting necessary for the new transmission device is completed, and the substitute transmission device is configured to perform when the new transmission device is newly connected as a replacement, submitting a request for the configuration setting of the new transmission device to the control device by substitute communication, and transmitting to the new transmission device the configuration information transmitted by the control device in response to the request.

* * * * *